(12) United States Patent
Oh et al.

(10) Patent No.: US 10,289,105 B1
(45) Date of Patent: May 14, 2019

(54) METHOD FOR RF COMMUNICATION BETWEEN AUTOMATED GUIDED VEHICLE AND MANUFACTURING EQUIPMENT IN AUTOMATED MATERIAL HANDLING SYSTEM

(71) Applicant: Hak Seo Oh, Gyeonggi-do (KR)

(72) Inventors: Hak Seo Oh, Gyeonggi-do (KR); Youl Kwon Sung, Gyeonggi-do (KR)

(73) Assignee: Hak Seo Oh, Gyeonggi-do (KR)

( * ) Notice: Subject to any disclaimer, the term of this patent is extended or adjusted under 35 U.S.C. 154(b) by 0 days.

(21) Appl. No.: 15/869,765

(22) Filed: Jan. 12, 2018

(30) Foreign Application Priority Data

Dec. 4, 2017 (KR) .................... 10-2017-0172163

(51) Int. Cl.
  *G06F 7/00* (2006.01)
  *G05B 19/418* (2006.01)
  *G05D 1/00* (2006.01)

(52) U.S. Cl.
  CPC ... *G05B 19/41895* (2013.01); *G05B 19/4185* (2013.01); *G05D 1/0022* (2013.01); *G05D 2201/0216* (2013.01)

(58) Field of Classification Search
  None
  See application file for complete search history.

(56) References Cited

U.S. PATENT DOCUMENTS

| 7,483,397 | B2* | 1/2009 | Meier | G06F 1/1626 370/256 |
| 7,917,145 | B2* | 3/2011 | Mahany | H04L 45/18 455/435.1 |
| 2009/0128139 | A1* | 5/2009 | Drenth | G01D 5/145 324/207.22 |
| 2018/0053141 | A1* | 2/2018 | Shydo, Jr. | G05D 1/104 |
| 2018/0113475 | A1* | 4/2018 | Brazeau | G05D 1/0297 |

FOREIGN PATENT DOCUMENTS

| KR | 101527686 | 6/2015 |
| KR | 101616706 | 5/2016 |

* cited by examiner

Primary Examiner — Yolanda R Cumbess
(74) Attorney, Agent, or Firm — IPLA P.A.; James E. Bame

(57) ABSTRACT

Provided is a technology capable of constructing an RF communication automated material handling system while minimizing structural change for a previously installed optical-communication automated material handling system, by constructing RF communication environment between an automated guided vehicle and manufacturing equipment by using separate communication modules provided in the automated guided vehicle and the manufacturing equipment.

9 Claims, 7 Drawing Sheets

METHOD FOR RF COMMUNICATION BETWEEN AUTOMATED GUIDED VEHICLE AND MANUFACTURING EQUIPMENT IN AUTOMATED MATERIAL HANDLING SYSTEM

CROSS REFERENCE

The present application claims priority to Korean Patent Application No. 10-2017-0172163, filed 4 Dec. 2017, the entire contents of which is incorporated herein for all purposes by this reference.

BACKGROUND

The present invention relates to a technology capable of constructing an RF communication automated material handling system while minimizing structural change for a previously installed optical-communication automated material handling system, by constructing RF communication environment between an automated guided vehicle and manufacturing equipment by using separate communication modules provided in the automated guided vehicle and the manufacturing equipment.

Generally, in manufacturing processes of a liquid crystal display device and a semiconductor element, the manufacturing goods are transferred to the manufacturing equipment of each manufacturing process by using an automated material handling system (AMHS), so that the corresponding goods are manufactured according to the manufacturing processes of each manufacturing equipment. Such an automated material handling system utilizes an unmanned transporting device for transferring a carrier of receiving a semiconductor substrate or a liquid crystal substrate to the manufacturing station located on the manufacturing process line and transferring the carrier of again receiving the goods completely processed in the corresponding manufacturing equipment to the next manufacturing equipment.

Depending on the movement method thereof, the unmanned transporting device includes an automated guided vehicle (AGV) for driving through the wheel, a rail guided vehicle (RGV) for driving along the guide rail located at the bottom, and an overhead hoist transport (OHT) for driving a guide rail installed in the ceiling. These unmanned transporting devices are moved to the corresponding manufacturing equipment by using the wheel itself or along the bottom rail or the overhead rail and it carries the carrier onto or carries the carrier out the manufacturing equipment by using an operating arm or a hoist and a hand.

The carrying/carrying out of the carriers is accomplished by the host computers mounted on the unmanned transporting device and the manufacturing equipment under the control of the main controller for controlling the entire manufacturing lines. At this time, since it requires the interlock operation between the unmanned transporting device and the manufacturing equipment during the carrying/carrying out of the carrier, transmission devices of an optical communication mode using an IR (Infrared) are installed on the unmanned transporting device and the manufacturing equipment respectively so as to send and receive the necessary data, thereby smoothly performing the carrying/carrying out of the carriers.

FIG. 1 is a schematic diagram illustrating a communication system for automated material handling system using a conventional IR optical communication. In the practice of the communication using this way, there is a disadvantage in that communication units between an unmanned transporting device and a manufacturing equipment should be installed in close proximity as possible. Accordingly, in order to communicate with the unmanned transporting device installed on the ceiling using the IR optical communication, the communication unit of the manufacturing equipment must be installed on the ceiling in like manner.

Owing to this installation constraint, the cable of the communication unit for facility should be installed along the ceiling having above 5 m height. Also, it has difficulty in the beauty and management inside the plant. Moreover, since it sends and receives the communication without the generation of a unique ID, the communication interference between adjacent communication devices can be generated due to the optical noise.

Where it replaces the IR optical communication module with the RF (Radio-Frequency) communication module so as to overcome the above drawbacks, since the data is transmitted through the ID, it can avoid the problem of the interference. Also, although the communication unit for equipment is not installed on the ceiling, the communication between the unmanned transporting device and the manufacturing equipment can be made.

FIG. 2 is a schematic diagram illustrating a communication system for automated material handling system using a conventional RF communication. In this RF communication method, since each manufacturing equipment should be given a unique ID, the unmanned transporting device recognizes the corresponding ID for manufacturing equipment and communication channel information and then, it should be set for RF communication module in the unmanned vehicle controller, so that the communication between the unmanned transporting device and the manufacturing equipment can be made. At this time, the corresponding ID and the communication channel information are inputted to the communication modules of each manufacturing equipment in advance.

As shown in FIG. 3, the unmanned transporting device is provided with both of IR communication module and RF communication module, so that the automated material handling system is capable of selectively utilizing the optical communication method and the RF communication method has been proposed. In this communication method, any one of the optical communication method and the RF communication method can be selectively utilized so as to minimize the data transmission error owing to the surrounding environment in response to the position of the manufacturing equipment.

However, the automated material handling system using the conventional optical communication method is already established in the factory or it tries to establish a new automated material handling system using the RF communication method shown in FIG. 2 and FIG. 3. Since the communication module has never had the ID setting function in automated material handling system using the conventional IR optical communication method, even structure of the unmanned vehicle controller of the unmanned transporting device should be changed over all during the replacement of communication module (IR mode→RF mode) or the addition thereof (IR mode→IR mode+RF mode) so as to provide the ID setting function.

That is, as shown in FIG. 1, in the IR optical communication method, only input and output terminals are connected between the unmanned vehicle controller of the unmanned transporting device and the communication module. However, as shown in FIG. 2 and FIG. 3, since it performs the ID and channel setting through the serial terminal in the RF communication method, the unmanned vehicle controller of the unmanned transporting device should be newly developed.

Thus, in order to change the automated material handling system using the conventional optical communication method to the automated material handling system using the RF communication method, since the unmanned transporting device should be changed or replaced over all, the facility lines should be suspended for a number of years. Accordingly, there are problems in that a lot of time and cost and an inconvenience of a user are involved.

Patent Literature 1: Korean Patent Registration No. 10-1527686 (Jun. 3, 2015; Title: Data Transmission System For Automated Material Handling System)

Patent Literature 2: Korean Patent Registration No. 10-1616706 (Apr. 25, 2016; Title: RF Communication System And Method For Automated Material Handling System)

SUMMARY OF THE INVENTION

The present invention has been made in consideration of the circumstances, and a technical object thereof is to provide a method for RF communication between an automated guided vehicle and manufacturing equipment in an automated material handling system. In the method, each of an automated vehicle communication unit and an equipment communication unit is additionally provided with an IR transmission module or an IR reception module or is provided with an RF transmission and reception module, initial setting information for RF communication between the automated vehicle communication unit and equipment communication unit is transmitted and received through the modules to construct RF communication environment, and it is possible to perform RF communication between the automated guided vehicle and the manufacturing equipment by a simple method of replacing only the communication units of the automated guided vehicle and the manufacturing equipment in the automated material handling system installed in advance.

According to an aspect of the invention to achieve the object described above, there is provided a method for RF communication between an automated guided vehicle and manufacturing equipment in an automated material handling system which transfers materials among a plurality of manufacturing equipment through the automated guided vehicle, wherein an automated vehicle communication unit of the automated guided vehicle is provided with an initialization setting transmission module for transmitting information related to initialization setting and an equipment communication unit provided in the manufacturing equipment is provided with an initialization setting reception module for receiving information related to initialization setting, the method including: an eleventh step in which the automated vehicle communication unit transmits automated vehicle RF initialization information to the manufacturing equipment through the initialization setting transmission module in a state where the automated guided vehicle is provided with the automated vehicle communication unit in which automated vehicle RF initialization information including an automated vehicle ID and RF channel information is registered; a twelfth step in which the equipment communication unit receives the automated vehicle RF initialization information applied from the automated vehicle communication unit through the initialization setting reception module in a state where the manufacturing equipment is provided with the equipment communication unit in which equipment RF initialization information including an equipment ID is registered; a thirteenth step of initializing a second RF communication module on the basis of the automated vehicle initialization information which the equipment communication unit receives through the initialization setting reception module; a fourteenth step in which the equipment communication unit converts the equipment RF initialization information into an RF signal through the second RF communication module and transmits the RF signal to the automated guided vehicle; a fifteenth step in which the automated vehicle communication unit initializes a first RF communication module on the basis of the equipment RF initialization information applied from the equipment communication unit; and a sixteenth step of transmitting and receiving information related to loading and unloading of materials with an RF signal through the first RF communication module of the automated vehicle communication unit and the second RF communication module of the equipment communication unit.

Preferably, the RF channel information includes first channel information corresponding to a first frequency for initialization setting and second channel information corresponding to a second frequency for control data communication, and a frequency bandwidth of the second frequency is set larger than that of the first frequency; in the eleventh step, the automated vehicle communication unit transmits automated RF initialization information including the first channel information to the manufacturing equipment; in the fourteenth step, the equipment communication unit transmits equipment RF initialization information including the second channel information to the automated guided vehicle by using the first frequency, and then initializes the second RF communication module to the second frequency; in the fifteenth step, the automated vehicle communication unit initializes the first RF communication module to the second frequency; and in the sixteenth step, the automated vehicle communication unit and the equipment communication unit transmits and receives control data related to loading and unloading with an RF signal by using the second frequency.

In the eleventh step, the automated vehicle communication unit transmits RF initialization information including an equipment ID corresponding to the position thereof to the manufacturing equipment through the initialization setting transmission module; and in the thirteenth step, the equipment communication unit performs an RF initialization setting process for the second RF communication module only when the automated vehicle RF initialization information received through the initialization setting reception module includes the equipment ID thereof.

Preferably, a barcode corresponding to equipment RF initialization information including at least one of an equipment ID, an RF channel, and a communication medium is attached to the manufacturing equipment; and in the eleventh step, the automated vehicle communication unit acquires the equipment ID for the corresponding manufacturing equipment through a barcode recognition means, and transmits automated vehicle RF initialization information including the acquired equipment ID to the manufacturing equipment through the initialization setting transmission module.

Preferably, the barcode recognition means includes a barcode position recognition sensor and a barcode reader, and the automated vehicle communication unit is connected to a TRIG signal line providing a command to read a barcode when the barcode position recognition sensor recognizes arrival at a barcode position, a RxD signal line through which an automated vehicle controller receives the barcode information read through the barcode reader, a TxD signal line through which the automated vehicle controller transmits a response signal for the barcode information to the barcode reader, an OK signal line through which the barcode reader transmits completion of barcode reading to the automated vehicle controller, and an NG signal line through which the barcode reader transmits occurrence of error in barcode reading to the automated vehicle controller, and recognizes the barcode information.

Preferably, the initialization setting transmission module and the initialization setting reception module are one communication medium of an ultrasonic wave, IR light, or radio frequency.

According to another aspect of the invention to achieve the object described above, there is provided a method for RF communication between an automated guided vehicle and manufacturing equipment in an automated material handling system which transfers materials among a plurality of equipment through an automated guided vehicle, the method including: a twenty-first step in which an equipment communication unit transmits equipment RF initialization information on a predetermined cycle through an initialization setting transmission module in a state where an equipment communication unit in which the equipment RF initialization information including an equipment ID and an RF channel is registered is attached to manufacturing equipment; a twenty-second step in which an automated guided vehicle including an automated vehicle communication unit in which automated vehicle RF initialization information including an automated vehicle ID is registered receives equipment RF initialization information transmitted from the manufacturing equipment around the manufacturing equipment for work, through the initialization setting reception module; a twenty-third step in which the automated vehicle communication unit initializes a first RF communication module on the basis of the equipment RF initialization information received through the initialization setting reception module; and a twenty-fourth step of transmitting and receiving information related to loading and unloading of materials with an RF signal through the first RF communication module of the automated vehicle communication unit and a second RF communication module of the equipment communication unit.

Preferably, in the twenty-first step, the equipment communication unit transmits equipment RF initialization information including an automated vehicle ID on a predetermined cycle through the initialization setting transmission module; and in the twenty-third step, the automated vehicle communication unit performs an RF initialization setting process for the first RF communication module only when the equipment RF initialization information received through the initialization setting reception module includes the automated vehicle ID thereof.

Preferably, the initialization setting transmission module and the initialization setting reception module are one communication medium of an ultrasonic wave, IR light, or radio frequency.

BRIEF DESCRIPTION OF THE DRAWINGS

The above and other objects, features and advantages of the present invention will be more apparent from the following detailed description taken in confluence with the accompanying drawings, in which.

DETAILED DESCRIPTION OF THE PREFERRED EMBODIMENT

Hereinafter, a preferred embodiment according to the present invention will be described in detail with reference to the accompanying drawings. Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them. This invention can be implemented in many different forms without departing from technical aspects or main features.

First, hereinafter, initial setting information for RF communication between an automated vehicle communication unit and an equipment communication unit is defined as "RF initialization information", RF initialization information for an automated guided vehicle is defined as "automated vehicle RF initialization information", and RF initialization information for manufacturing equipment is defined as "equipment RF initialization information".

In addition, according to the present invention, a communication medium for transmitting control information between an automated guided vehicle and manufacturing equipment and a communication medium for RF initialization setting are provided respectively and it is possible to easily upgrade the existing system to an RF system even without change of upper sides through the mediums. In this case, the communication medium for RF initialization setting may be ultrasonic wave, IR light, radio frequency, and the like. When RF initialization setting is performed by using radio frequency, it is possible to use a radio module of the existing system.

In embodiments described hereinafter, the communication medium for RF initialization setting is IR by way of example.

Figure 4:
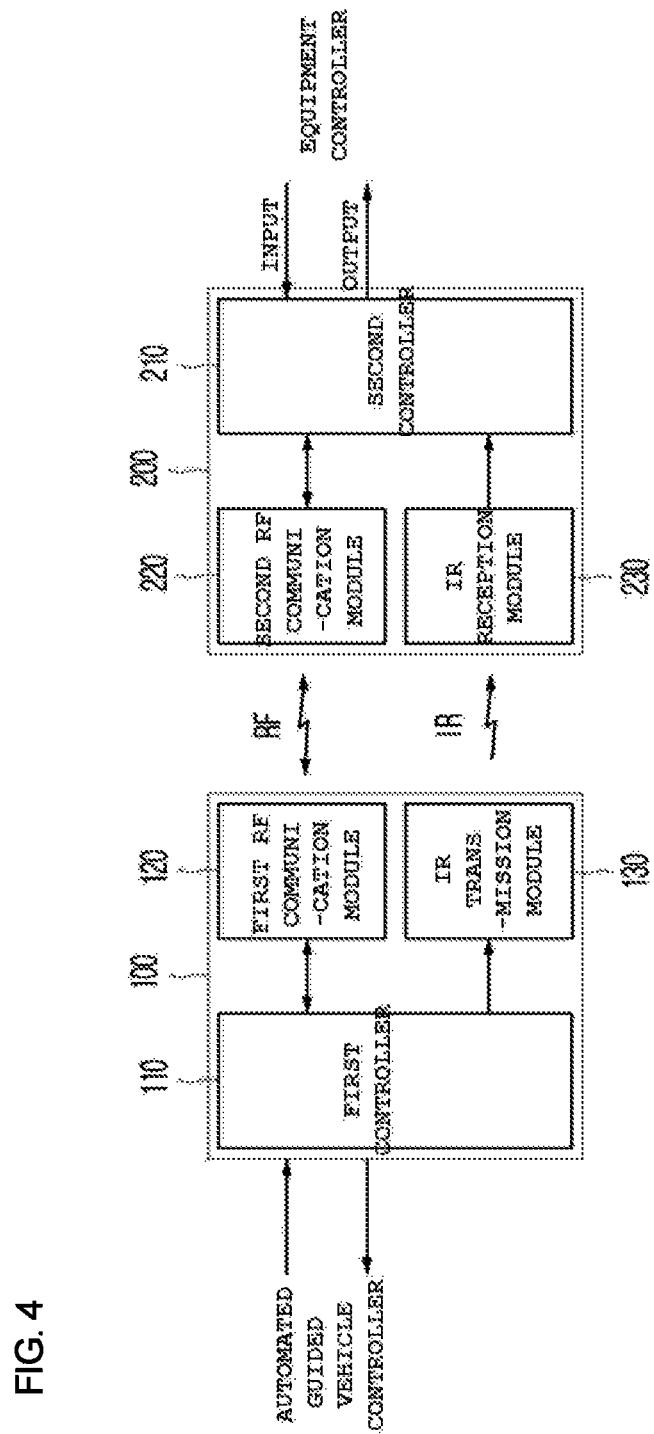
FIG. 4 is a block diagram illustrating functionally divided internal configurations of an automated vehicle communication unit (100) and an equipment communication unit (200) in an automated material handling system according to an embodiment of the present invention.

FIG. 4 is a block diagram illustrating functionally divided internal configurations of an automated vehicle communication unit (100) and an equipment communication unit (200) in an automated material handling system according to a first embodiment of the present invention. An RF communication system for the automated material handling system according to the present invention is applied to an automated material handling system which transfers materials among a plurality of manufacturing equipment through an automated guided vehicle, and is configured with a communication system in which an automated vehicle communication unit (100) provided in the automated guided vehicle and an equipment communication unit (200) provided in each of a plurality of manufacturing equipment transmit and receive data to and from each other.

Referring to FIG. 4, the automated vehicle communication unit (100) is connected to an automated vehicle controller of an automated guided vehicle through input/output signal lines and performs data communication, and the equipment communication unit (200) is connected to an equipment controller of manufacturing equipment through input/output signal lines and performs data communication.

The automated vehicle communication unit (100) includes a first controller (110), a first RF communication module (120), and an IR transmission module (130), and the equipment communication unit (200) includes a second controller (210), a second RF module (220), and an IR reception module (230).

The first controller (110) of the automated vehicle communication unit (100) performs data communication with the equipment communication unit (200) through the IR transmission module (130) or the first RF communication module (120) on the basis of the information provided from the automated vehicle controller of the automated guided vehicle.

In this case, the first controller (110) of the automated vehicle communication unit (100) transmits RF initialization information to the equipment communication unit (200) through the IR transmission module (130), and transmits control information related to transferring of materials to the equipment communication unit (200) through the first RF communication module (120).

The first RF communication module (120) of the automated vehicle communication unit (100) includes an input/output circuit which transmits and receives a signal to and from the first controller (110), an RF modulation/demodulation circuit, and an RF antenna, and transmits control data applied from the first controller (110) to the equipment communication unit (200) through RF communication, and receives an RF signal type of equipment RF initialization information received from the equipment communication unit (200).

The IR transmission module (130) of the automated vehicle communication unit (100) includes an IR modulation circuit which modulates a signal provided from the first controller (110) into an IR signal, and an IR LED, and transmits automated vehicle RF initialization information applied from the first controller (110) to the equipment communication unit (200) through IR communication.

In addition, the second controller (210) of the equipment communication unit (200) stores equipment RF initialization information including manufacturing equipment identification information such as a port name, that is, an equipment ID and channel information, analyzes data transmitted from the automated vehicle communication unit (100) to the equipment communication unit (200), and extracts identification information. The second RF communication module (220) generates a response signal only when the extracted identification information coincides with the identification information of the manufacturing equipment, and transmits the response signal to the second RF communication module (220).

In this case, the second controller (210) extracts the automated vehicle RF initialization information for the automated guided vehicle from the IR signal received through the IR reception module (230), performs initialization on the basis of the extracted automated vehicle RF initialization information, and transmits the equipment RF initialization information thereof to the automated guided vehicle through the second RF communication module (220).

The second RF communication module (220) of the equipment communication unit (200) is formed in the same structure as that of the first RF communication module (120), and performs RF communication with the automated guided vehicle. The second RF communication module (220) receives the data transmitted from the first RF communication module (120) and transmits a response signal corresponding thereto, thereby constructing communication link between the first communication module (120) and the second RF communication module (220).

The IR reception module (230) of the equipment communication unit (200) is disposed at the position corresponding to the IR transmission module (130) of the automated vehicle communication unit (100), receives an IR signal generated from the IR transmission module (130), analyzes the received IR signal, and extracts the automated vehicle RF initialization information.

In other words, the automated vehicle communication unit (100) transmits the automated vehicle RF initialization information to the IR reception module (230) of the equipment communication unit (200) through the IR transmission module (130), and the equipment communication unit (200) initializes the second RF communication module (220) on the basis of the automated vehicle RF initialization information. Accordingly, the equipment RF initialization information is transmitted to the first RF communication module (120) of the automated vehicle communication unit (100), thereby setting RF link between the automated vehicle communication unit (100) and the equipment communication unit (200) to perform RF communication.

Therefore, in the present invention, the RF initialization setting between the automated vehicle communication unit (100) and the equipment communication unit (200) is performed even without changing the structure of the automated vehicle controller of the automated guided vehicle, and it is possible to perform RF communication therebetween.

Figure 5:
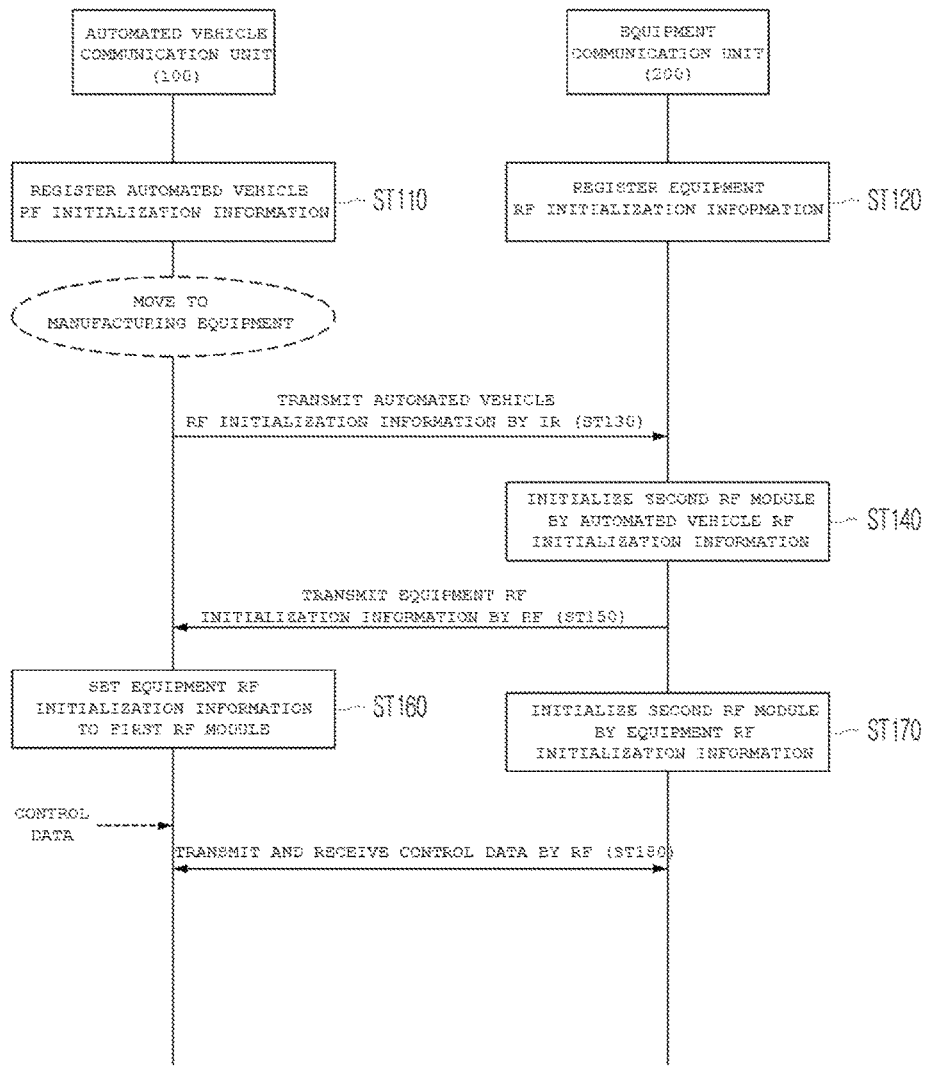
FIG. 5 is a diagram for explaining a method for RF communication between an automated guided vehicle and manufacturing equipment in an automated material handling system according to an embodiment of the invention.

FIG. 5 is a diagram for explaining a method for RF communication between an automated guided vehicle and manufacturing equipment in an automated material handling system according to the first embodiment of the invention.

Referring to FIG. 5, the method for RF communication between the automated vehicle communication unit (100) and each equipment communication unit (200) in the automated material handling system which transfers materials among a plurality of manufacturing equipment through the automated guided vehicle includes the following steps.

First, in the automated vehicle communication unit (100), automated vehicle RF initialization information including an automated vehicle ID corresponding to the automated guided vehicle and RF channel information is stored in advanced (ST110). In this case, the RF channel information may be one or more with frequency bands different from each other. For example, the RF channel information may be set with frequencies different from each other depending on the type of data transmitted to and received from the equipment communication unit (100), or may be set with frequencies different from each other in consideration of radio wave environment depending on the position of manufacturing equipment or the like. In addition, when the RF channel information is set with frequencies different from each other depending on the type of data, the channel information may be set to be transmitted by division into a first frequency at the time of transmitting the RF initialization information and a second frequency at the time of transmitting material control information in the assigned frequency band, and it is preferable that the bandwidth of the first frequency is smaller than that of the second frequency.

In addition, in the RF initialization information, when the number of ports of the manufacturing equipment is at least two, the port number of the manufacturing equipment may be added as an RF initialization setting parameter.

Meanwhile, in the equipment communication unit (200), equipment RF initialization information including an equipment ID corresponding to the manufacturing equipment is stored in advance (ST120).

As described above, the automated vehicle communication unit (100) and the equipment communication unit (200) are attached to the automated vehicle controller of the automated guided vehicle and the equipment controller of the manufacturing equipment, respectively, in a state where the RF initialization information thereof is registered in advance. In this case, the automated vehicle communication unit (100) is set to a standby mode in which a data transmission process is not performed by the automated vehicle controller, and the equipment communication unit (200) is set to an IR reception mode for receiving an IR signal.

In this case, the automated vehicle communication unit (100) and the equipment communication unit (200) may be attached to the automated vehicle and the manufacturing equipment after setting RF initialization information thereof by using a separate setting tool, or may be set by using a separate tool in a state of being attached to the automated vehicle and the manufacturing equipment.

In the state, when the automated guided vehicle moves and stops at the position where the manufacturing equipment is positioned, the automated vehicle controller provides a control signal capable of setting a communicable mode to the automated vehicle communication unit (100). In other words, the automated vehicle communication unit (100) can transmit desired information to the manufacturing equipment in the state of being set to the communicable mode.

When the communicable mode control signal input from the automated vehicle controller is activated, the automated vehicle communication unit (100) modulates the automated vehicle RF initialization information into an IR signal, and transmits the IR signal to the IR reception module (230) of the equipment communication unit (200) through the IR transmission module (130) (ST130). In this case, the automated vehicle RF initialization information basically includes an automated vehicle ID and RF channel information, and the RF channel information may be first channel information corresponding to a first frequency for initialization setting. In addition, the automated vehicle RF initialization information may further include an equipment ID.

When the equipment communication unit (200) receives the IR signal transmitted from the automated communication unit (100) through the IR reception module (230), the equipment communication unit (200) analyzes the received IR signal, extracts the automated vehicle RF initialization information, and initializes the second RF communication module (220) on the basis of the extracted automated RF initialization information (ST140).

The second RF communication module (220) of the equipment communication unit (200) transmits the equipment RF initialization information to the automated vehicle communication unit (100) by using the registered automated vehicle RF initialization information (ST150). In other words, the second RF communication module (220) transmits the equipment RF initialization information for transmitting and receiving control data by using the first frequency.

The automated vehicle communication unit (100) receives the RF signal transmitted from the equipment communication unit (200) through the first RF communication module (120), analyzes the received RF signal, extracts the equipment RF initialization information, and initializes the first RF communication module (120) on the basis of the extracted equipment RF initialization information (ST160).

The second RF communication module (220) of the equipment communication unit (100) transmits the equipment RF initialization information to the automated vehicle communication unit (100) by using the first frequency, and then is initialized again on the basis of the equipment RF initialization information for transmitting and receiving control data (S 170).

Then, when the automated vehicle communication unit (100) receives control information (input signal of the automated vehicle communication unit) for transferring materials from the automated vehicle controller, the automated vehicle communication unit (100) converts the control information to RF signal through the first RF communication module (120), and transmits the converted RF signal to the equipment communication unit (200). The equipment communication unit (200) receives the RF signal transmitted from the automated vehicle communication unit (100) through the second RF communication module (220), transmits the RF signal (output signal of the equipment communication unit) to the equipment controller, and transmits control information (input signal of the equipment communication unit) input from the equipment controller as a response signal for reception of the automated vehicle control information to the automated vehicle communication unit (100). The automated vehicle communication unit (100) performs a series of RF communication of transmitting the equipment control signal (output signal of the automated vehicle communication unit) received from the automated vehicle controller (ST180).

In this case, in the step ST(150), the equipment communication unit (200) transmits second channel information for transmitting control data to the automated vehicle by using the first frequency through the second RF communication module (220). In the step ST160, the automated vehicle communication unit (100) initializes the first RF communication module (120) to the second frequency corresponding to the second channel information, and the automated vehicle communication unit (100) and the equipment communication unit (200) can transmit and receive the control data through RF communication using the second frequency.

Meanwhile, in FIG. 5, the automated vehicle communication unit (100) can transmit the automated vehicle RF initialization information additionally including the equipment ID corresponding to the position to the manufacturing equipment through the IR transmission module (130). The equipment communication unit (200) can perform an RF initialization setting process for the second RF communication module (220) only when the equipment ID thereof is included in the automated vehicle RF initialization information received through the IR reception module (230).

In this case, the automated vehicle communication unit (100) acquires the equipment ID through a separate barcode recognition means, and can regenerate the automated vehicle RF initialization information to include the equipment ID. In the case of acquiring the equipment ID through the barcode recognition means, it is obvious that a barcode corresponding to the equipment RF initialization information including the equipment ID of the manufacturing equipment has to be attached to one side of the manufacturing equipment. In this case, when the existing automated material handling system is provided with a barcode recognition means, it is possible to use the automated material handling system as it is.

Figure 1:
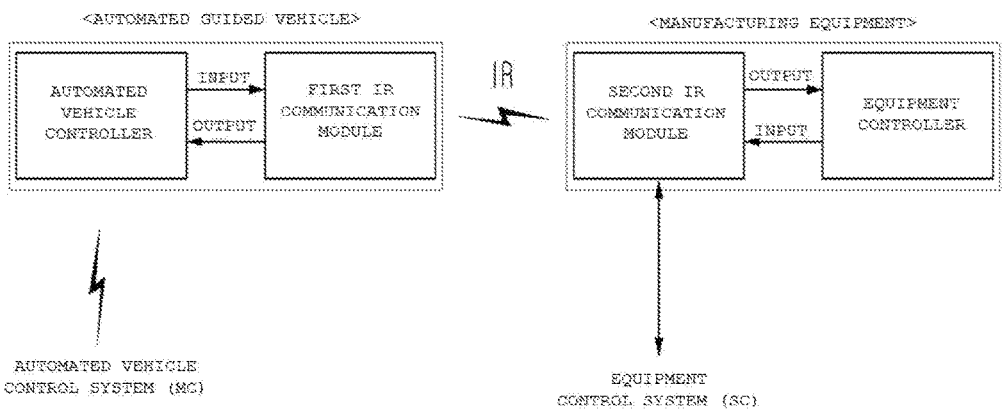
FIG. 1 is a schematic diagram illustrating a communication system for automated material handling system using a conventional IR optical communication.
Figure 2:
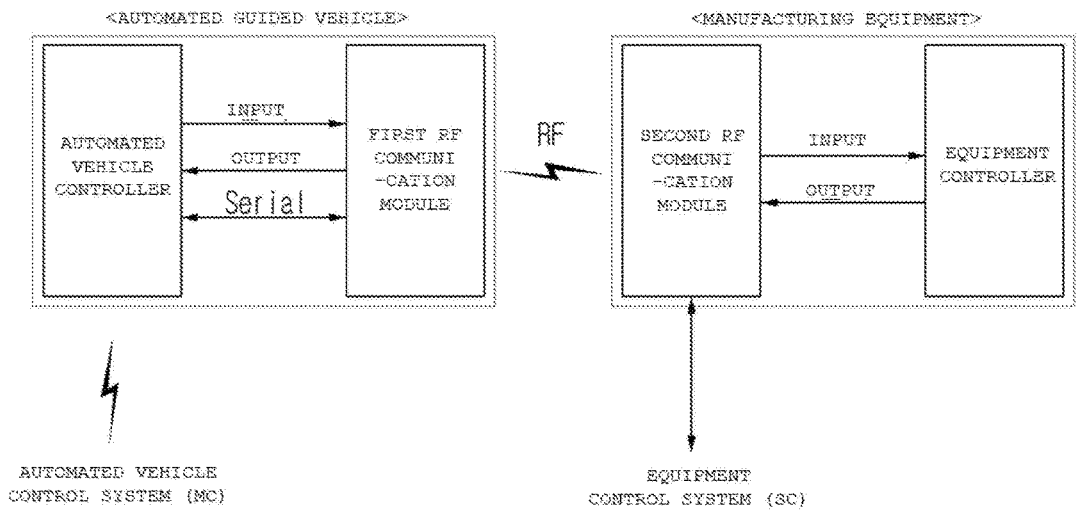
FIG. 2 and FIG. 3 are schematic diagrams illustrating a communication system for automated material handling system using a conventional RF communication.
Figure 3:
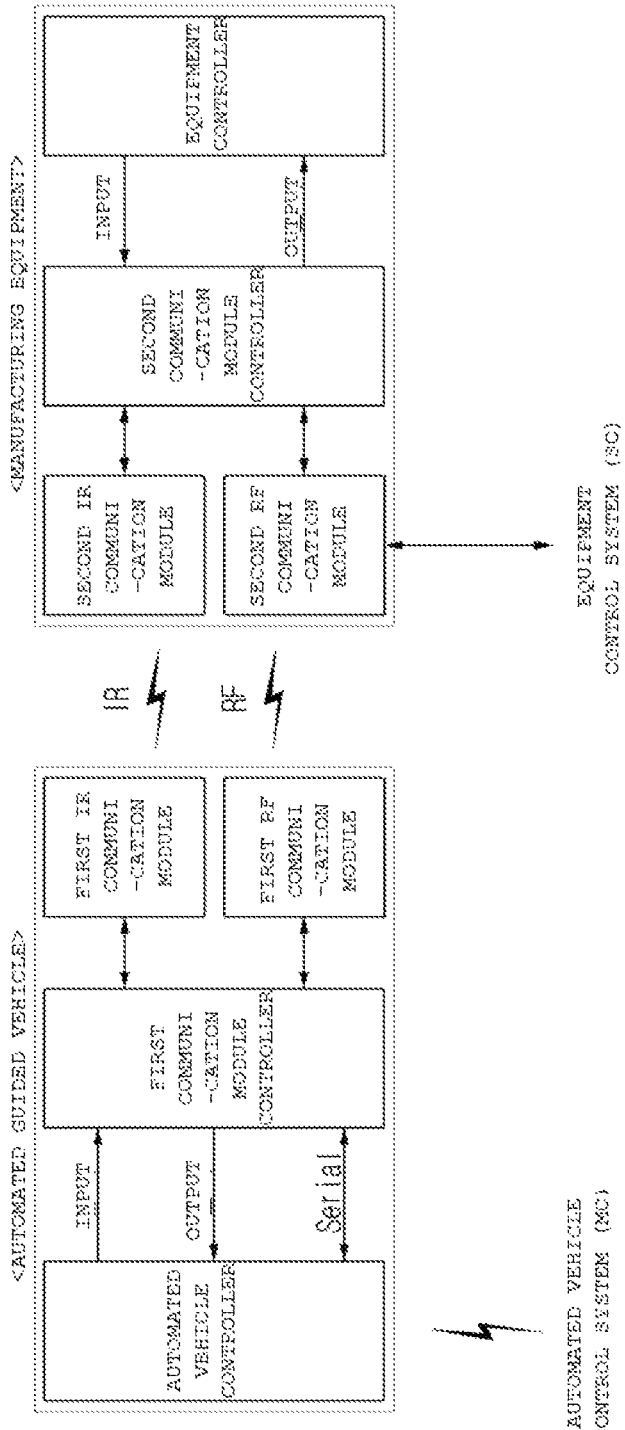

In addition, the configuration in which the automated vehicle communication unit (100) is provided with a barcode recognition means and a barcode is attached to one side of the manufacturing equipment may be applied and embodied to a system which transmits control information by selectively using various communication mediums (RF or IR) as illustrated in FIG. 3.

In such a system, a barcode including communication medium information in addition to the equipment ID may be attached. The automated vehicle communication unit (100) confirms the communication medium information from the barcode received through the barcode recognition means, and transmits control information by using the communication medium. In this case, the RF initialization setting is performed on the RF communication medium by the same method as the flowchart illustrated in FIG. 5.

In addition, the present invention may be applied even to a system which performs RF communication at the time of transmitting and receiving control information between the automated guided vehicle and the manufacturing equipment or which selectively uses IR communication. In case of applying the present invention to such a system, a barcode attached to the manufacturing equipment may further include communication medium information.

Figure 6:
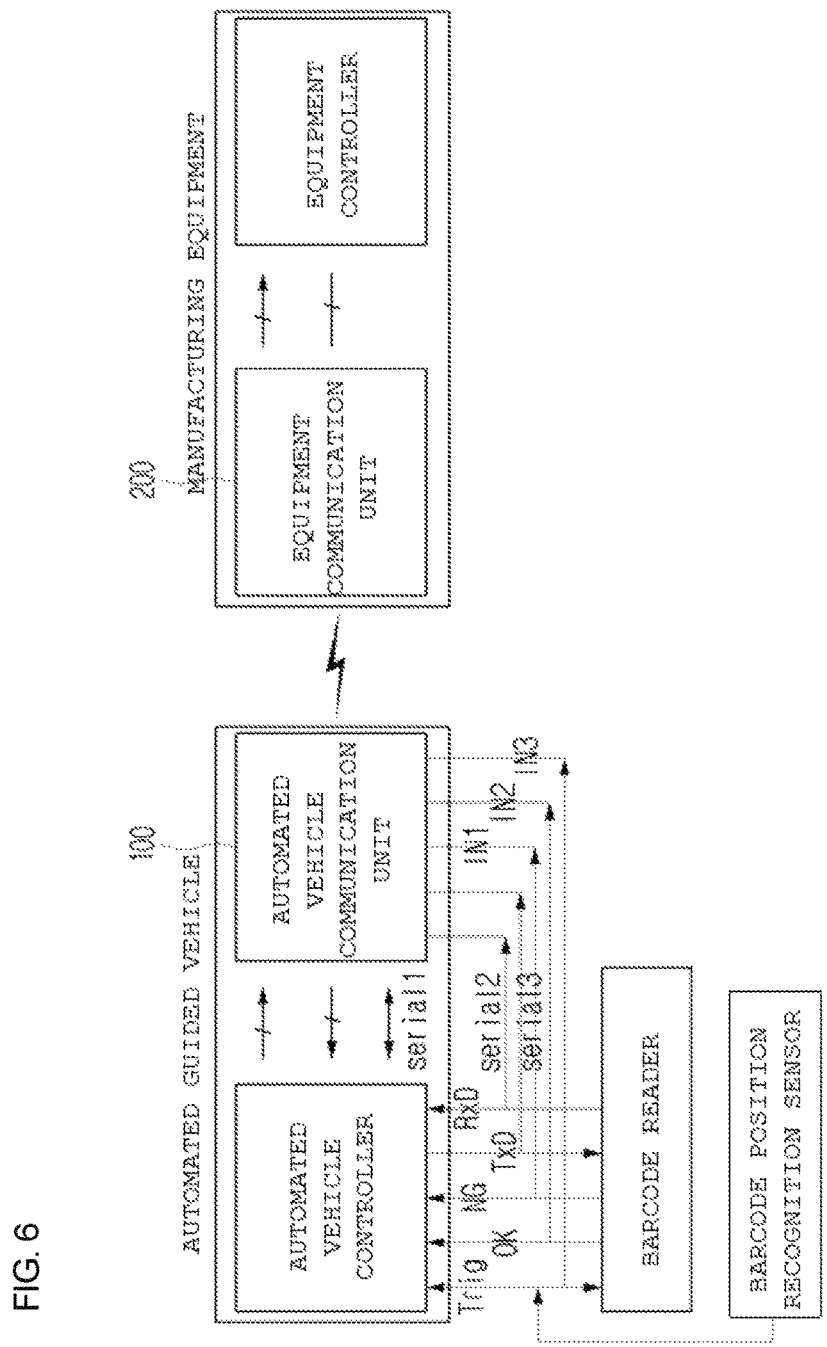
FIG. 6 is a schematic diagram illustrating an automated material handling system according to another embodiment of the invention.

In addition, in an automated material handling system including a barcode recognition means, as illustrated in FIG. 6, a barcode position recognition sensor is connected between an automated vehicle controller and a barcode reader, an input/output signal such as a barcode recognition result (OK or NG) and a serial communication signal are connected to an automated vehicle communication unit (100), and it is possible to more accurately recognize barcode information.

In other words, the automated vehicle communication unit (100) may be connected to a TRIG signal line providing a command to read a barcode when the barcode position recognition sensor recognizes arrival at a barcode position, a RxD signal line through which an automated vehicle controller receives the barcode information read through the barcode reader, a TxD signal line through which the automated vehicle controller transmits a response signal for the barcode information to the barcode reader, an OK signal line through which the barcode reader transmits completion of barcode reading to the automated vehicle controller, and an NG signal line through which the barcode reader transmits occurrence of error in barcode reading to the automated vehicle controller.

Meanwhile, in the embodiment, only the RF ID and the RF channel are presented as RF initialization parameters of the automated guided vehicle (100). However, when the number of ports of the manufacturing equipment (300) is at least two, the port number of the manufacturing equipment (300) may be added as an RF initialization setting parameter, and a setting operation therefor is the same as the setting value registration process for the RF ID and RF channel described above.

Figure 7:
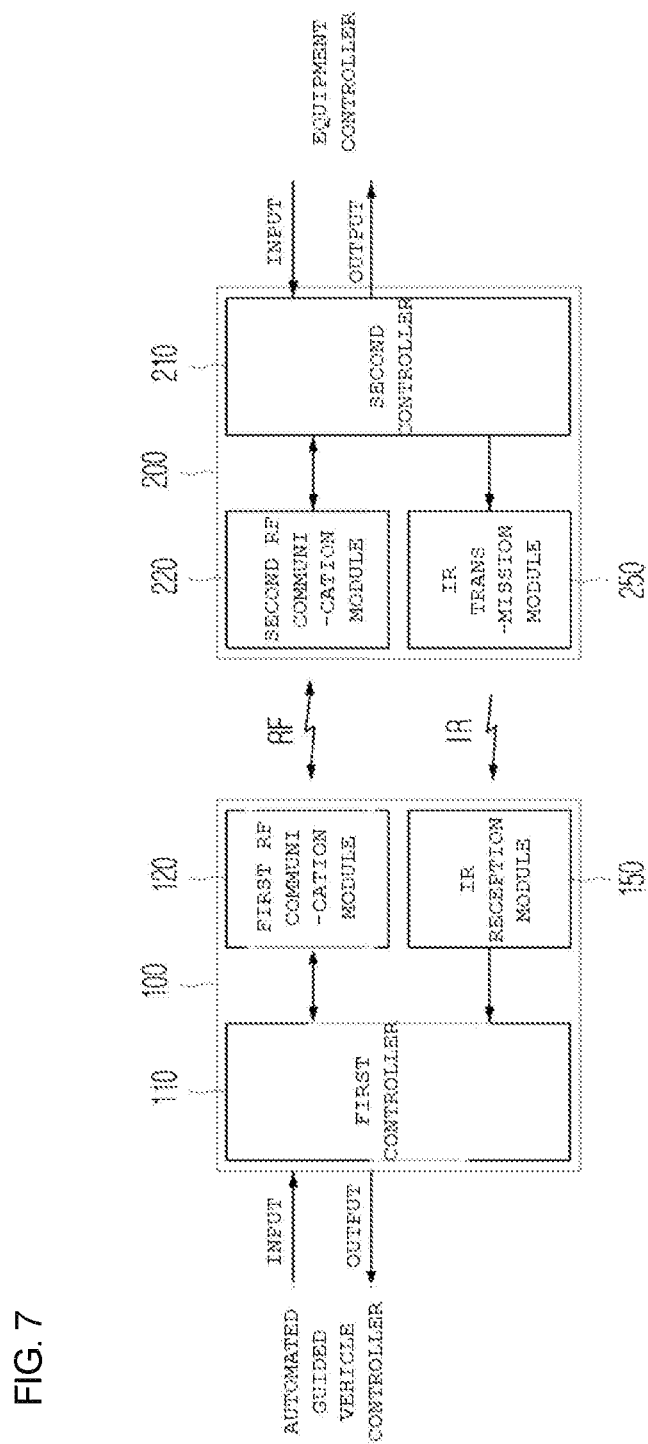
FIG. 7 is a block diagram illustrating functionally divided internal configurations of an automated vehicle communication unit (100) and an equipment communication unit (200) in an automated material handling system according to another embodiment of the invention.

FIG. 7 is a block diagram illustrating functionally divided internal configurations of an automated vehicle communication unit (100) and an equipment communication unit (200) in an automated material handling system according to a second embodiment of the invention. Hereinafter, the same reference numerals and signs are given to the same constituent elements as the constituent elements illustrated in FIG. 4, and detailed description there is not repeated.

In an RF communication system for an automated material handling system according to a second embodiment as illustrated in FIG. 7, the automated vehicle communication unit (100) is provided with an IR reception module (150), and the equipment communication unit (200) is provided with an IR transmission module 250.

In other words, the equipment communication unit (200) transmits equipment RF initialization information on a predetermined cycle through the IR transmission module (250), and the automated vehicle communication unit (100) transmits automated vehicle RF initialization information to a second RF communication module (220) of the equipment communication unit (200) through a first RF communication module (120) by using the equipment RF initialization information received through the IR reception module (150), thereby performing RF communication between the automated vehicle communication unit (100) and the equipment communication unit (200).

Figure 8:
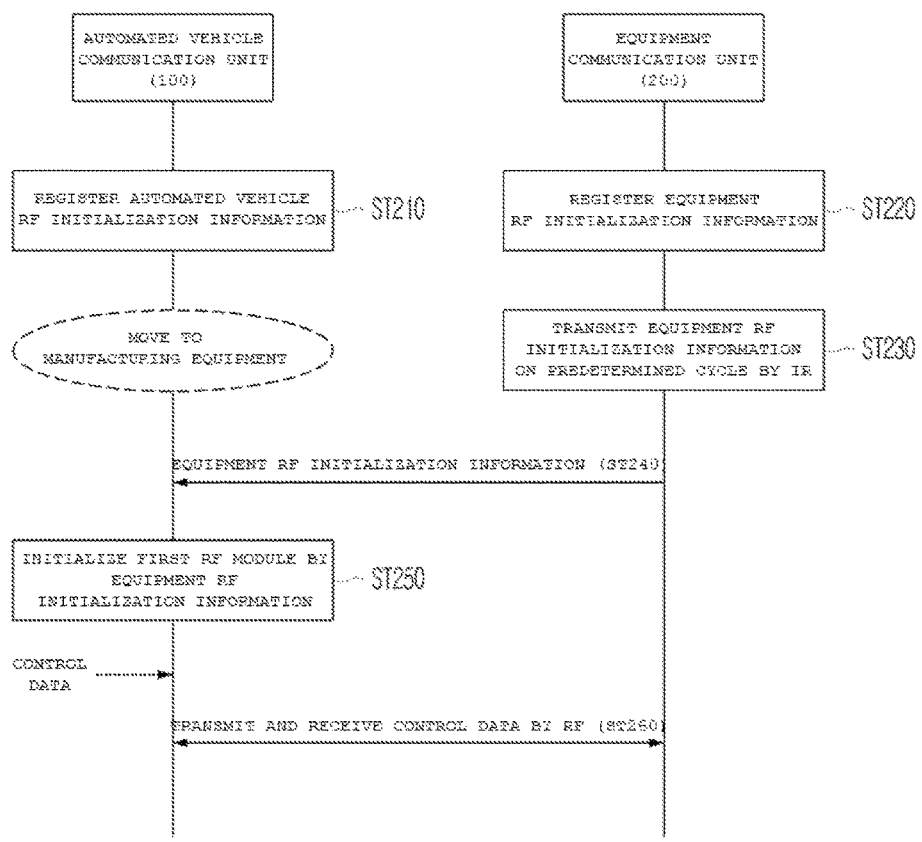
FIG. 8 is a diagram for explaining a method for RF communication between an automated guided vehicle and manufacturing equipment in an automated material handling system according to another embodiment of the invention.

FIG. 8 is a diagram for explaining a method for RF communication between an automated guided vehicle and manufacturing equipment in an automated material handling system according to the second embodiment of the invention.

First, in the automated vehicle communication unit (100), automated vehicle RF initialization information including an automated vehicle ID corresponding to an automated guided vehicle is stored (ST210).

In addition, in the equipment communication unit (200), equipment RF initialization information including an equipment ID corresponding to the manufacturing equipment and RF channel information is stored (ST220).

In the state, the equipment communication unit (200) transmits the equipment RF initialization information through the IR transmission module (250) on a predetermined cycle by IR (optical) (ST230). In this case, the second RF communication module (220) of the equipment communication unit (200) is set to an RF signal reception standby state. The equipment communication unit (200) can transmit the equipment RF initialization information including the automated vehicle ID by IR (optical).

Thereafter, when the automated guided vehicle moves, enters a place where the manufacturing equipment is positioned, and approaches an IR signal radius of the equipment communication unit (200), the IR reception module (150) of the automated vehicle communication unit (100) receives an IR signal transmitted from the equipment communication unit (200), that is, equipment RF initialization information (ST240). In other words, the automated vehicle communication unit (100) analyzes the received IR signal, extracts the equipment RF initialization information, and initializes the first RF communication module (120) on the basis of the extracted equipment RF initialization information (ST250). In this case, the automated vehicle communication unit (100) can perform an RF initialization setting process for the first RF communication module only when the equipment RF initialization information received through the IR reception module (150) includes an automated vehicle ID thereof.

The automated vehicle communication unit (100) sets a transmission mode on the basis of the information input from the automated vehicle controller, and transmits and receives control data for transferring materials to and from the equipment communication unit (200) by RF (ST260).

As described above, each of an automated vehicle communication unit and an equipment communication unit is additionally provided with an IR transmission module or an IR reception module or is provided with an RF transmission and reception module, initial setting information for RF communication between the automated vehicle communication unit and equipment communication unit is transmitted and received through the modules to construct RF communication environment, and it is possible to perform RF communication between the automated guided vehicle and the manufacturing equipment by a simple method of replacing only the communication units of the automated guided vehicle and the manufacturing equipment in the automated material handling system installed in advance.

While the present invention has been described with respect to the specific embodiments, it will be apparent to those skilled in the art that various changes and modifications may be made without departing from the spirit and scope of the invention as defined in the following claims.

What is claimed is:

1. A method for RF communication between an automated guided vehicle and a plurality of manufacturing equipment in an automated material handling system, said manufacturing equipment transfers materials throughout the materials handling system
   through the plurality of manufacturing equipment to be retrieved by said automated guided vehicles,
   said automated guided vehicle comprises an automated vehicle communication unit that includes an initialization setting transmission module for transmitting information related to an initialization setting of the automated guided vehicle, and
   the manufacturing equipment includes an equipment communication unit that includes an initialization setting reception module for receiving information related to
   initialization setting;
   the method comprising the steps of:
   transmitting, by the initialization setting transmission module, automated vehicle RF initialization information by the automated vehicle communication unit to at least one of the manufacturing equipment, wherein automated vehicle RF initialization information including an automated vehicle ID and RF channel information is registered;
   receiving, by the equipment communication unit, the automated vehicle RF initialization information from the automated vehicle communication unit through the initialization setting reception module, wherein the equipment RF initialization information is registered and said equipment RF initialization information includes an equipment ID;
   initializing an RF communication module in the equipment communication unit based on the automated vehicle initialization information, the equipment communication unit receives the automated vehicle RF initialization information through the initialization setting reception module;
   converting, by the equipment communication unit, the equipment RF initialization information into an RF signal through the RF communication module, and transmitting the RF signal to the automated guided vehicle;
   initializing, by the automated vehicle communication unit, a first RF communication module based on the equipment RF initialization information from the equipment communication unit; and
   transmitting and receiving, with an RF signal, information related to loading and unloading of materials through the RF communication module of the automated vehicle communication unit and the RF communication module of the equipment communication unit.

2. The method for RF communication between an automated guided vehicle and a plurality of manufacturing equipment in an automated material handling system according to claim 1, wherein RF channel information includes first channel information corresponding to a first frequency for the initialization setting, and second channel information corresponding to a second frequency for control data communication;
   the bandwidth of the second frequency is set larger than the bandwidth of the first frequency;
   the automated vehicle communication unit transmits the automated RF initialization information along with the first channel information to the manufacturing equipment;
   the equipment communication unit transmits the equipment RF initialization information along with the second channel information to the automated guided vehicle at the first frequency, and subsequently initializes the RF communication module at a second frequency;
   the automated vehicle communication unit initializes the RF communication module at the second frequency, and
   the automated vehicle communication unit and the equipment communication unit transmits and receives control data related to loading and unloading of materials using an RF signal at the second frequency.

3. The method for RF communication between an automated guided vehicle and manufacturing equipment in an automated material handling system according to claim 1, wherein the automated vehicle communication unit transmits RF initialization information including an equipment ID corresponding to the position thereof to the manufacturing equipment through the initialization setting transmission module, and
   wherein the equipment communication unit performs an RF initialization setting process for the second RF communication module only when the automated vehicle RF initialization information received through the initialization setting reception module includes the equipment ID thereof.

4. The method for RE communication between the automated guided vehicle and manufacturing equipment in an automated material handling system, wherein a barcode corresponding to equipment RF initialization information including at least one of an equipment ID, an RE channel, and a communication medium is attached to the manufacturing equipment, and the automated vehicle communication unit acquires the equipment ID for the corresponding manufacturing equipment through a barcode recognition means, and transmits automated vehicle RE initialization information and the acquired equipment ID to the manufacturing equipment through the initialization setting transmission module.

5. The method for RF communication between an automated guided vehicle and manufacturing equipment in an automated material handling system according to claim 4, wherein the barcode recognition means includes a barcode position recognition sensor and a barcode reader, and wherein the automated vehicle communication unit is connected to a TRIG signal line that gives a command to read a barcode when the barcode position recognition sensor recognizes the arrival of the automated vehicle at a barcode position;
- a RxD signal line through which an automated vehicle controller receives the barcode information read through the barcode reader;
- a TxD signal line through which the automated vehicle controller transmits a response signal for the barcode information to the barcode reader;
- an OK signal line through which the barcode reader transmits completion of barcode reading to the automated vehicle controller;
- and an NG signal line through which the barcode reader transmits an occurrence of an error in the barcode reading to the automated vehicle controller.

6. The method for RF communication between an automated guided vehicle and manufacturing equipment in an automated material handling system according to claim 1, wherein the initialization setting transmission module and the initialization setting reception module are included in one communication medium comprising an ultrasonic wave, IR light, or radio frequency.

7. A method for RF communication between an automated guided vehicle and manufacturing equipment in an automated material handling system transferring materials, the method comprising the steps of:
- transmitting, by an equipment communication unit, equipment RF initialization information on a predetermined cycle through an initialization setting transmission module, wherein the equipment RF initialization information including an equipment ID and an RF channel is registered and is attached to manufacturing equipment wherein the automated guided vehicle includes an automated vehicle communication unit wherein automated vehicle RF initialization information and an automated vehicle ID is registered;
- receiving equipment RF initialization information from the manufacturing equipment through the initialization setting reception module;
- initializing, by the automated vehicle communication unit, a first RF communication module based on the equipment RF initialization information received through the initialization setting reception module; and
- transmitting and receiving information related to loading and unloading of
- materials by an RF signal through a first RF communication module of the automated vehicle communication unit, and a second RF communication module of the equipment communication unit.

8. The method for RF communication between an automated guided vehicle and manufacturing equipment in an automated material handling system according to claim 7, wherein the equipment communication unit transmits equipment RF initialization information including an automated vehicle ID on a predetermined cycle through the initialization setting transmission module, and
- the automated vehicle communication unit performs an RF initialization setting process for the first RF communication module only when the equipment RF initialization information is received through the initialization setting reception module and the initialization information includes the automated vehicle ID.

9. The method for RF communication between an automated guided vehicle and manufacturing equipment in an automated material handling system according to claim 7, wherein the initialization setting transmission module and the initialization setting reception module are included in one communication medium comprising an ultrasonic wave, IR light, or radio frequency.

* * * * *